Patented Sept. 30, 1952

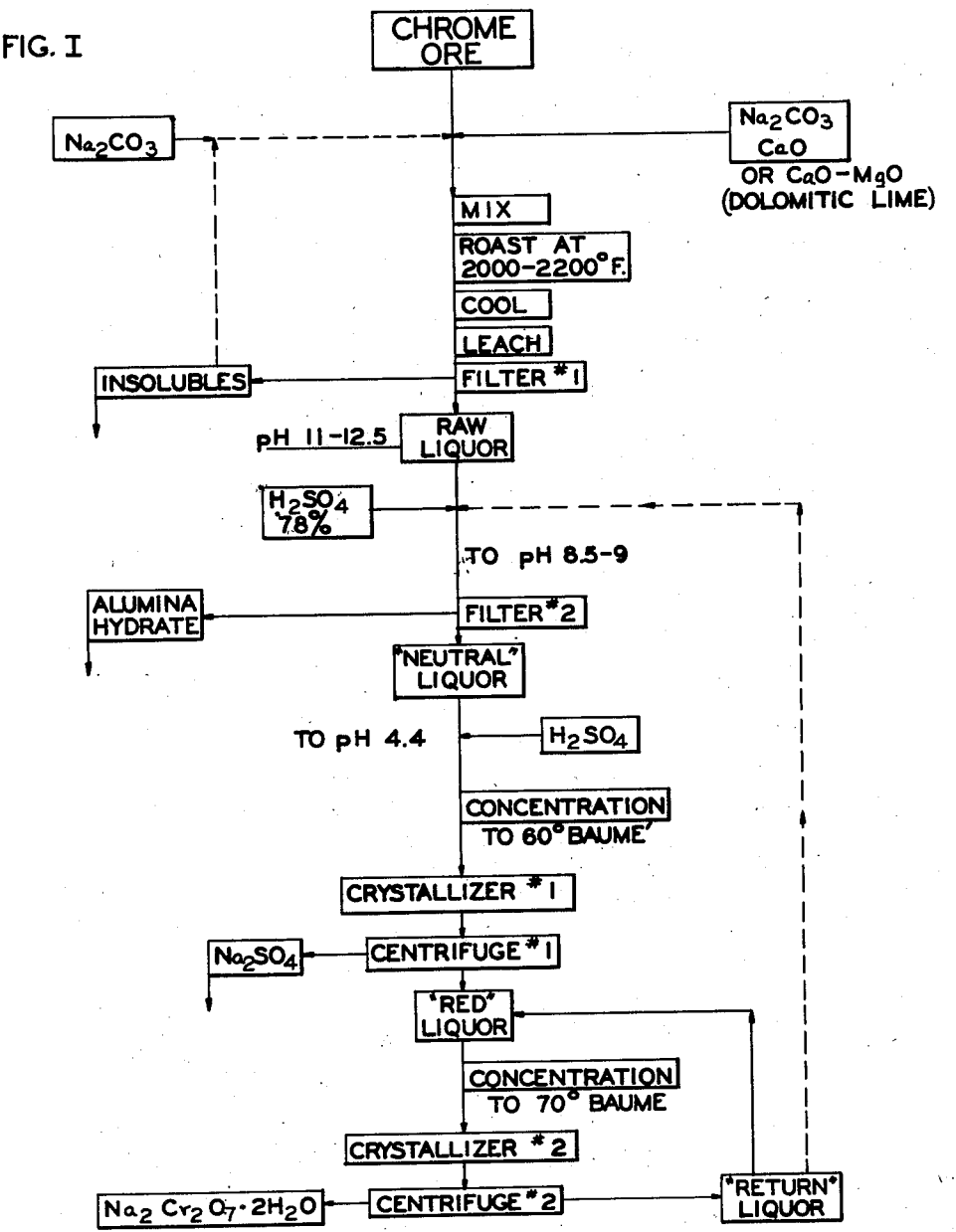

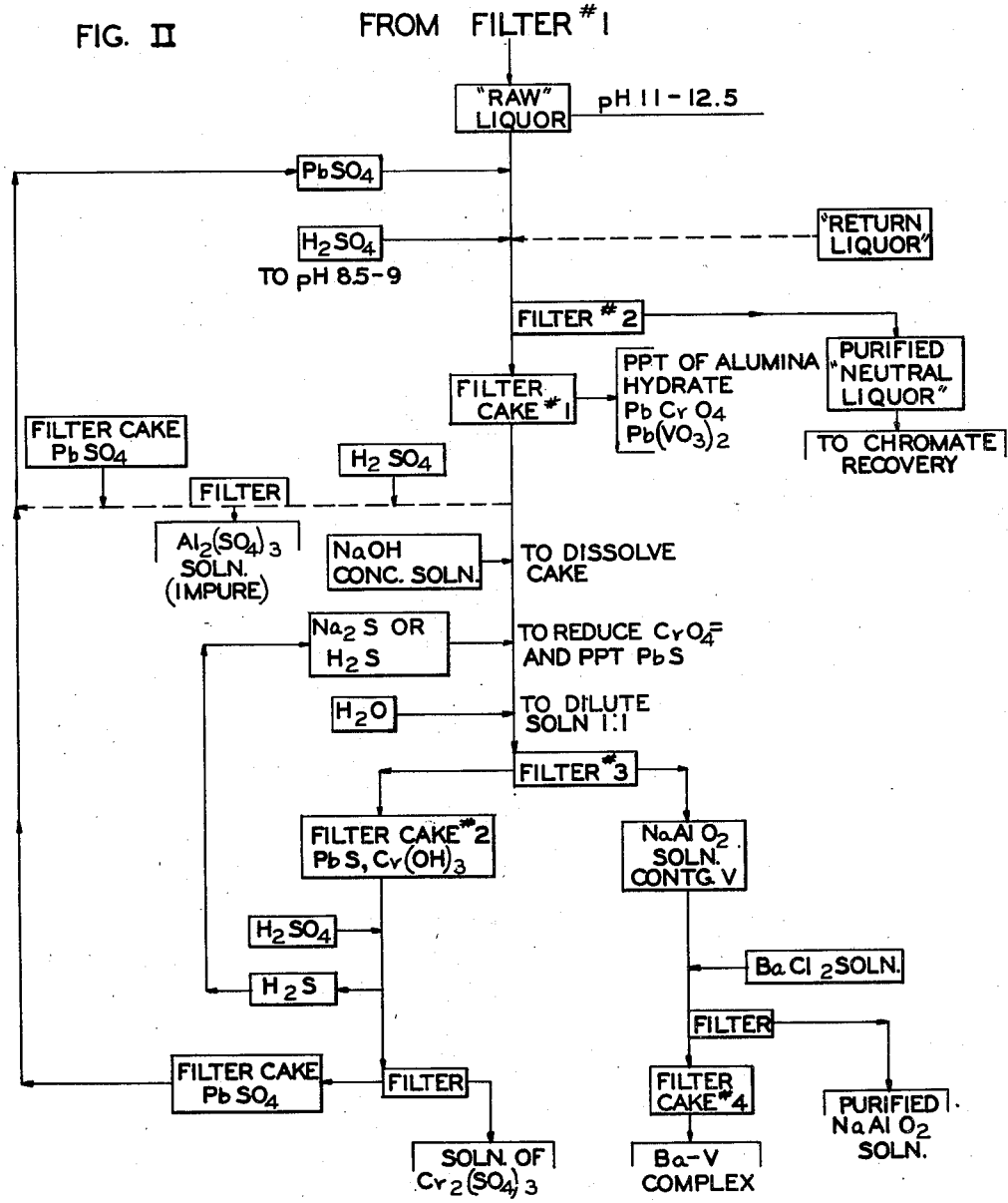

2,612,435

UNITED STATES PATENT OFFICE 2,612,435

METHOD FOR RECOVERY OF VANADIUM-FREE CHROMATE AND ALUMINATE

Tom S. Perrin and Robert G. Banner, Painesville, Ohio, assignors to Diamond Alkali Company, Cleveland, Ohio, a corporation of Delaware Application November 13, 1948, Serial No. 59,934

7 Claims. (Cl. 23—52)

This invention relates to a method for recovering vanadium and aluminum values from solutes comprising the same, and more particularly relates to a method for the recovery of vanadium and aluminum values from solutes containing a relative preponderance of chromium values and lesser amounts of aluminum and vanadium values, in which method a vanadium sequestering agent is employed and is recovered directly and recycled in the process in the form recovered. The method also provides for obtaining solutions of aluminum salts and chromium salts substantially uncontaminated by vanadium salts and by each other. The method has particular applicability to the alkaline liquors obtained from leaching of alkali chrome ore roasts.

It has heretofore been proposed to recover vanadium values generally associated with aqueous liquors containing chromate salts, such, for example, as the aqueous leach liquors obtained from the alkali roasting of chromite ores. Specifically, it has been proposed to recover vanadium values from such liquors by a method which consists essentially in acidifying the aqueous leach liquors with sulfuric acid to about pH 4.4, to form bichromate, fractionally crystallizing alkali metal sulfate from the liquors, filtering the crystallized alkali metal sulfate, concentrating the filtrate, and crystallizing alkali metal bichromate. The alkali metal bichromate is separated from the mother liquor, for example, by centrifuging, and finally the pH of the mother liquor is adjusted to about 1.7, whereby vanadium is precipitated and recovered as vanadium oxide, or a hydrate thereof. This process has many disadvantages, the principal one of which lies in the step of precipitating chrome values in a vanadium bearing solution, whereby an appreciable quantity of vanadium co-precipitates with or is carried by the chrome values and clean separation is therefore precluded. Moreover, the precipitation of remaining vanadium at pH 1.7 also is not complete and recycle of the filtrate from this precipitation, which is necessary for high yields of chromium values, results in return of the remaining vanadium which thus builds up in concentration in the recovery system.

Also, it has heretofore been proposed to separate vanadium salts occurring in solutions of chromate salts by converting the vanadium salts to ammonium metavanadate and precipitating a barium salt of metavanadic acid from slightly ammoniacal dilute aqueous solutions containing the ammonium metavanadate, which procedure is disadvantageous as incomplete separation is experienced due to relative insolubility of barium chromate in ammoniacal solutions, co-precipitation of remaining iron and aluminum in the solution further contaminates the barium metavanadate, and the extraneous ammonium ion must subsequently be removed from the main chromium liquors, whereby an extra step is added to the chrome recovery process.

It has also been proposed to precipitate a calcium salt of vanadic acid from slightly acid solutions containing vanadic ions, the acid being employed to prevent the precipitation of iron or aluminum hydroxides. The calcium precipitate is thereafter processed to recover the vanadium in the desired form. This method, however efficient it may be for recovery of vanadium values, is precluded by the solubility of calcium chromate in acid solutions where chrome recovery is important, since calcium chromate occurs as a contaminant of sodium bichromate in the ultimate bichromate recovery.

Moreover, it has heretofore been proposed to "hold back" vanadium salts from aqueous solutions obtained after the alkali roasting of chromite ores, by incorporating alkaline earth metal oxides with such ores, prior to the roasting. The alkaline earth metal oxides in the roast mix form vanadate salts which are relatively insoluble in water and are thus to some extent held back and not carried over into the chromate process liquors, when the roast is leached with water. In addition to the disadvantage that vanadium is only partially held back by such treatment and thus appreciable amounts of vanadium in soluble form are leached out with the chromium values, a further effect of this process is that the vanadium held back in the leached residue from the roast mix is thereafter unavailable for recovery by economically satisfactory methods, due to the large bulk of material which must be processed to recover the relatively small amount of vanadium present therein.

As to the aluminum values generally associated with chrome ores, from which the chromium and vanadium values are sought to be recovered, it has heretofore been the practice in the art to precipitate alumina hydrate, contaminated with chromium values, prior to the precipitation of the chromium and vanadium values and then to discard the impure alumina, or to use it in the production of low-grade aluminum chemicals, such as impure alum. This procedure has involved a loss of alumina, the value of which is significant but insufficient to justify extensive purification, and also a loss of the chrome values contaminating the alumina.

In contrast to these prior art proposals, the present invention presents an efficient method for the co-precipitation of compounds of vanadium and aluminum and for the recovery of purified solutions of chromium salts. Moreover, the present method substantially precludes the accumulation of deleterious amounts of vanadium compounds within the chromate recovery system, while simultaneously providing a cyclic process in which the vanadium sequestering agent is recovered and reused substantially without loss thereof.

An additional advantage of the present invention over prior art practice is that substantially pure alumina hydrate uncontaminated by chromium salts is recoverable therefrom and is available as a source material for a wide variety of aluminum chemicals, for which it could not heretofore be used in view of chromate contamination. Moreover, the expense of processing to obtain this high-grade alumina is not significantly greater than the expense of obtaining impure alumina hydrate experienced by the prior art. Accordingly, a substantial advantage is gained in that a further by-product of value is recovered from the chrome processing, which heretofore was only of border-line utility.

As noted above, the present invention may be applied to a conventional chrome ore treating process with the advantage that early in that process, the vanadium concentration is reduced to a tolerable limit, whereby its presence may be disregarded in the remainder of the chrome treating steps, especially since build-up of vanadium concentration in the process is obviated. In addition, the vanadium, heretofore largely discarded especially where found in ores predominating in chrome values, is recoverable by economically feasible means and becomes a valuable credit to the whole process.

These and other advantages of the invention will appear more fully hereinafter from a general description and a specific example, both of which further elucidate the manner in which the invention may be practiced. The invention is more particularly described in connection with the drawings forming a part of the specification, in which, Fig. I is a chemical process flow-sheet illustrating an alkali roast method of treating chrome ores to recover chrome values therefrom, and, Fig. II is a chemical process flow-sheet of the method of the present invention interposed in the process of Fig. I immediately prior to the neutralization of "raw liquor."

Referring now to Fig. I, the chrome bearing ore is comminuted and mixed with sodium carbonate and calcium oxide or dolomitic lime (CaO-MgO). One purpose of the sodium carbonate is to react with the chromium and aluminum oxides of the ore to form water-extractable compounds thereof. The lime is employed primarily to maintain a granular consistency in the roast mix during the roasting process, which may suitably be carried out in a rotary kiln or other convenient roasting means, and secondarily, to diminish the amount of water extractable vanadium salts formed during the roasting of the ore. The roasting of the mix is carried out at a temperature ranging between 2000° and 2200° F., after which the roast is cooled and leached with water. As a result of the leaching step, an aqueous liquor containing sodium chromate, sodium vanadate, sodium aluminate, and other salts, and an insoluble residue are obtained. The liquor and residue may be separated by filtration, as at filter #1. The residue is dried and combined with further amounts of sodium carbonate (this time without the addition of lime), as indicated by the dotted line to the left of the main stream of Fig. I, and separately recycled in the roasting and leaching process hereinabove described, with the result that further amounts of the chrome values contained in the roast residue are thereby removed. The leach liquor from the first roast and the liquor from the recycle roast are combined and are designated in Fig. I as "raw liquor," and as shown, ordinarily have a pH within the range of 11–12.5. The "raw liquor" is treated with sulfuric acid (78%), or with acidic solutions recovered subsequently in the process, to bring the pH of the "raw liquor" within the range 8.5–9 in order to precipitate the alumina hydrate, which may be present in the ore in an amount as high as 15%. The alumina hydrate, contaminated with appreciable amounts of chromium as chromates, is separated from the aqueous partially neutralized liquors by filtration, as at filter #2, the filtrate then being referred to as "neutral liquor." The precipitate carries with it approximately ½ of the original vanadium values occurring in the "raw liquor," the remainder being carried into the "neutral liquor" as soluble vanadates. It is this precipitate which in prior art practice has been discarded or sold as low-grade, impure alumina hydrate.

The "neutral liquor" is next acidified with sulfuric acid (78%) to bring the pH of the solution to about 4.4, whereupon chromate ion is converted to bichromate ion in the solution. Thereafter the solution may be suitably concentrated, preferably to about 60° Bé., and then cooled to approximately room temperature. The concentration and cooling steps result in the crystallization of sodium sulfate, at crystallizer #1, the mother liquor comprising the chromate values as bichromates and the vanadium values as an acid or acid salt thereof. The crystallized sodium sulfate is removed from the mother liquor by centrifuging as at centrifuge #1. The acid mother liquor, after the removal of sodium sulfate, is referred to as "red liquor." The "red liquor" is further concentrated in order to crystallize the bichromate values therefrom. After suitable concentration, for example, to 70° Bé., sodium bichromate crystallizes from the concentrated "red liquor" at crystallizer #2 and is centrifuged at centrifuge #2 to remove the mother liquor, which liquor is designated as "return liquor." The crystals are the finished product of the process and are, if no "return liquor" has been used in make-up of the "red liquor," reasonably free of vanadium and other impurities. However, as pointed out more fully below, "return liquor" usually is employed and in such case, the crystals are contaminated with vanadium to an extent of between 0.2 and 1%, taken as sodium vanadate. This amount of vanadium is sufficient to cause substantial difficulty in tanning operations and to detract seriously from the value of the bichromate as a raw material for chromate pigments.

The "return liquor" carries with it appreciable amounts of the chrome values as well as the vanadium values which have not been removed with the bichromate crystals. Since the "return liquor" has a pH very close to that of the "red liquor" from centrifuge #1, such "return liquor" is returned to the main stream via the "red liquor," for further concentration and crystallization of the bichromates dissolved therein, or is returned to the main stream as indicated by the dotted line to the right of the main stream of Fig. I, as a part of the acid required to neutralize "raw liquor." It will be appreciated that such recycling of the "return liquor" ultimately results in accumulating an undesirable amount of vanadium salts within the system, which salts contaminate the bichromate crystals obtained therefrom and adversely affect the crystallization of bichromates, as well as the chemical and physical properties of the chemicals subsequently to be obtained from such bichromates. However, discarding the "return liquor" is not a solution to the problem as economically wasteful quantities of bichromates would be lost. Heretofore, various of the prior art expedients set forth above for avoiding vanadium build-up and excessive concentrations of vanadium in finished bichromate have been resorted to with little success.

The accumulation of undesirable amounts of vanadium compounds in recycled chromate liquors is substantially precluded by the method of the present invention in that the vanadium concentration is reduced to a tolerable limit in the "raw liquor" stage of chromium recovery, and even the remaining small amount of vanadium is disenabled to build up in the system, since recycled liquors are also subjected to treatment. Accordingly, better crystal form and a more rapid crystallization of a purer bichromate is obtained with the further advantage that vanadium and aluminum compounds in commercially acceptable forms are recoverable. A method for the separation of vanadium and chromium values by treating solutes comprising the same with lead ions to obtain a precipitate of lead vanadate does not form a part of the present invention, except as herein claimed, but is disclosed and claimed in a co-pending application, Ser. No. 59,935, filed of even date herewith, in the name of one of the present inventors and another, now Patent No. 2,583,591, dated January 29, 1952.

The present invention is directed to a method of removing vanadium and aluminum salts from solutes containing a preponderance of a mixture of alkali metal chromates with alkali metal aluminates, and a minor proportion of alkali metal vanadates, which includes the steps of providing a source of lead ions in a solution comprising said solutes, adjusting the alkalinity of said solution to a pH within the range of 8-9, thereby to co-precipitate substantially all of the vanadate ions and a minor proportion of the chromate ions of said solutes as their lead salts, and to convert all of said alkali metal aluminates to alumina hydrate, and separating the co-precipitate from the remainder of said solution. The invention also includes the recovery of lead, vanadium, chromium and aluminum values from said co-precipitate in accordance with steps to be set forth more fully hereinafter.

Reference is made to Fig. II of the drawing, wherein the present invention is shown interposed in an alkali roast process for the recovery of bichromates from chromium bearing ores, such as that illustrated by the process of Fig. I. The invention is not to be limited, however, to use in conjunction with the process of Fig. I, as it is applicable to any liquors containing chromium and vanadium values and having soluble aluminate compounds therein, which usually requires the existence of a pH sufficiently alkaline to permit the existence of such aluminates in the system in soluble form, such as a pH of 10-12. For convenience, however, the invention is described in connection with the process of Fig. I.

A suitable lead compound, such as lead oxide, lead hydroxide, lead sulfate, or basic lead sulfate, is made up into an aqueous slurry and added to the "raw liquor" with agitation. In addition to the lead compounds already noted, which compounds are recognized in the art as relatively water insoluble, soluble lead salts, such as lead nitrate, lead chloride, or lead acetate, may also be used in the practice of the present invention, where the anions of such compounds are not objectionable contaminants of the chromate liquors subsequently to be obtained. In general, it is preferred in the practice of the present invention to employ lead sulfate at this point of the process, especially since the lead salt may, if desired, be recovered as lead sulfate and may be recycled for re-use. The addition of such suitable lead compound to the "raw liquor" effects the removal of substantially all of the vanadium ions and a minor proportion of the chromate ions as precipitates comprising their lead salts. Either simultaneously with the addition of the source of lead ions or thereafter, the alkalinity of the "raw liquor" is adjusted to a pH within the range of 8–9 in order to co-precipitate the alumina values of the "raw liquor" as alumina hydrate with the precipitate of lead salts. The co-precipitate is separated from the mother liquor, suitably by filtration as shown at filter #2, the filtrate being processed thereafter in accordance with conventional methods for chromate recovery from "neutral liquor," for example, as illustrated in Fig. I.

The filter cake, as obtained from the above series of steps, may be discarded if desired, although economic advantages otherwise obtainable in accordance with one procedure of the present invention are thereby lost. Therefore, when considering the method of the present invention relative to commercial alkali roast processes for the recovery of chromium from its ores, it is preferable to provide for the recovery of at least the lead values from the filter cake.

Such recovery may suitably be accomplished by either of two routes, the first of which is illustrated in Fig. II by the dotted flow-line to the left of the main stream following filter cake 1 and comprises essentially the recovery of the lead values as substantially water insoluble lead salts other than lead chromate or lead vanadate, for example, lead sulfate. In following this first route, the filter cake is contacted with an acid, such as aqueous sulfuric acid, to convert the lead chromate and lead vanadate therein to the corresponding lead salts, the aluminum, chromium, and vanadium values of the filter cake being thereby converted to water soluble compounds from which insoluble lead sulfate is readily separated, for example, by filtration of the aqueous acid solution obtained by so treating the filter cake. Lead sulfate thus obtained may be recycled preferably as such to further "raw liquor" to aid in the separation of further vanadium therefrom.

The aqueous aluminum sulfate solution containing relatively small amounts of chromium and vanadium compounds may be used industrially as such, for example, in paper making, where relatively small amounts of chromium and vanadium compounds therein do not deleteriously affect the finished product, or the chromium and vanadium values may be recovered therefrom by methods known in the art.

By the second route, the chromium, vanadium, and aluminum values may be recovered separately, lead being recovered as lead sulfate and recycled to the "raw liquor" as in the first route. The second route is illustrated by that portion of Fig. II which follows filter cake 1. The filter cake comprising the co-precipitate of lead chromate, lead vanadate, and alumina hydrate is treated with a solution of alkali metal hydroxide, which may suitably be an aqueous solution of caustic soda, it having been found preferable in the method of the present invention, when employing caustic soda as the solution agent for the filter cake, to employ a concentrated aqueous solution, for example, commercial 50% caustic soda liquor, in slight stoichiometric excess of the amount required to react with the filter cake. The caustic soda liquor is preferably heated and agitated and the filter cake added thereto during such agitation, in order to effect efficient and substantially complete solution of the ingredients of the filter cake. After solution of the filter cake has been completed, a suitable source of sulfide ion is introduced into the solution to reduce the chromate ions to chromic ions and co-precipitate lead sulfide with chromic hydroxide.

The sulfide ion may be supplied from any suitable source, such, for example, as hydrogen sulfide, sodium sulfide, other alkali metal sulfide, or alkaline earth metal sulfide, such as the sulfides of barium and calcium. When substantially all of the chromate ions of the solution have been reduced to chromic hydroxide, the solution is preferably diluted with an equal volume of water in order to facilitate the subsequent filtration of the precipitate of the chromic hydroxide and lead sulfide. It has also been found in the practice of the present invention that such dilution results in a more rapid and complete co-precipitation of the lead sulfide and chromic hydroxide. The co-precipitate of lead sulfide and chromic hydroxide is separated from the mother liquor suitably at filter 3.

The co-precipitate is preferably recovered for further processing in accordance herewith, particularly to recover the lead values therefrom for further use in sequestering vanadium ions from additional quantities of "raw liquor." The filtrate comprising aqueous sodium aluminate, together with soluble vanadate salts, may be further purified by treating it with a suitable source of barium ions to precipitate the vanadate ions therefrom and leave the sodium aluminate solution substantially uncontaminated. The barium ions may be supplied from soluble barium salts such as the barium halides or from less soluble sources, such as barium sulfate or barium hydroxide. The amount of barium compound added to the solution of sodium aluminate is suitably within the range of 5–10 mols of the barium compound per mol of vanadate ion calculated as sodium metavanadate. The precipitate which forms and is separated by filtration appears to be a barium-vanadium complex and is presently of unidentified composition. The mother liquor contains the aluminum values from the chrome ore as sodium aluminate substantially uncontaminated by foreign substances other than sodium compounds and may be used thereafter in the preparation of high-grade aluminum chemicals.

In order to recover the lead values from the co-precipitate of lead sulfide and chromic hydroxide, the filter cake 2 from filter 3 is suitably treated with an acid, such as sulfuric acid, to dissolve the chromic hydroxide and decompose the lead sulfide to hydrogen sulfide and lead sulfate. Hydrogen sulfide recovered at this point may be recycled in the process for reduction of chromate ion. Though any suitable acid may be used at this step, aqueous sulfuric acid is preferred as lead, in the form of lead sulfate, is obtained as a precipitate and may suitably be recovered by filtration and recycled as shown, and soluble chromic sulfate is obtained in aqueous acid solution, from which it may readily be recovered after the lead separation.

In order that those skilled in the art may better understand the details of the method of the present invention and a preferred manner in which the same may be carried into effect, the following specific example is offered:

EXAMPLE

*Removal of vanadium and aluminum*

Two liters of "raw liquor" containing 0.88 g. p. l. of vanadium calculated as sodium metavanadate, 49.7 g. p. l. of aluminum oxide as $Al_2O_3$, and 347 g. p. l. of chromium calculated as sodium bichromate dihydrate are mixed with 24.6 grams of lead sulfate, which has been slurried with water to form a thick paste, the ratio of lead sulfate to sodium metavanadate being 14:1. 110 milliliters of sulfuric acid (78%) are slowly added to the mixture of "raw liquor" and lead sulfate over a period of 1½ hours with vigorous agitation. The precipitate is separated from the solution by filtration. An analysis of the filtrate shows that 92.4% of the vanadium originally contained in the "raw liquor" is removed in the precipitate.

*Recovery of aluminum, chromium, vanadium and lead*

The precipitate is added slowly with agitation to 136 milliliters of 47.9% aqueous sodium hydroxide (5% excess over the amount required to react with the aluminum and lead compounds in the precipitate). The aqueous sodium hydroxide is suitably added at a temperature very near its boiling point. After the solution of the precipitate has been completed, 28 grams of sodium sulfide monohydrate are added to the solution to precipitate the lead therein as lead sulfide, reduce the chromate ions and co-precipitate chromic hydroxide therewith. The amount of sodium sulfide to be added to the solution is readily calculated from the amount of lead sulfate added to the "raw liquor" and from an analysis of the co-precipitate for chromate ion. The solution is then diluted with an equal volume of water and agitated vigorously for several minutes and the precipitate allowed to settle. The co-precipitate of lead sulfide and chromic hydroxide is separated from the vanadium containing sodium aluminate solution by filtration. A determination of the amount of vanadium contained in the filtrate shows that 94% of that removed from the "raw liquor" remains in the filtrate. The co-precipitate of lead sulfide and chromic hydroxide is treated with 35 milliliters of 78% sulfuric acid in order to convert the lead sulfide to lead sulfate and the chromic hydroxide to chromic sulfate. The lead sulfate is recycled to additional quantities of "raw liquor" for further recovery of the vanadium salts therein, as hereinabove indicated, and the hydrogen sulfide from the decomposition of the lead sulfide recycled in the process either as such or in the form of sodium sulfide to reduce the chromate ion and precipitate lead sulfide as hereinabove noted. The solution of chromic sulfate is concentrated and 12 grams of crystalline chromic sulfate isolated therefrom. An aqueous solution of barium chloride containing 12.6 grams of barium chloride is added to the sodium aluminate solution in order to precipitate the vanadate ions therefrom, the amount of barium chloride added thereto being in the ratio of 10 mols of barium chloride per mol of vanadate calculated as sodium metavanadate contained in the sodium aluminate solution. A barium-vanadium complex precipitate forms in the solution, which precipitate contains substantially all of the vanadium present in the sodium aluminate solution (about 1.62 grams), as well as substantially all of the barium which was added thereto in the form of barium chloride. This condition is evidenced by chemical analyses of the sodium aluminate solution for vanadium and barium. The precipitate is allowed to settle and is finally separated from the sodium aluminate solution by filtration. Analysis of the precipitate shows that 94% of the vanadium retained in the sodium aluminate solution is recovered by precipitation with barium ion, which represents about 88% recovery of vanadium based on the amount originally contained in the "raw liquor."

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The method of removing and recovering vanadium and aluminum values from an alkaline solution having a pH of at least 10 comprising the same as vanadates and aluminates and a preponderance of alkali metal chromates, which includes the steps of contacting such solution with a lead compound which provides a source of lead ions in said solution, to co-precipitate substantially all of the vanadate ions and a minor proportion of the chromate ions as their lead salts, adjusting the alkalinity of said solution to a pH within the range of 8-9 to convert substantially all of said aluminum values to alumina hydrate, and co-precipitate said alumina hydrate with said lead salts, and separately recovering the substantially vanadium and aluminum-free chromate solution and said co-precipitate.

2. The method of removing and recovering vanadium and aluminum values from an alkaline solution having a pH of at least 10 comprising the same as vanadates and aluminates and a preponderance of alkali metal chromates, which includes the steps of contacting such solution with a substantially water insoluble lead compound which provides a source of lead ions in said solution, to co-precipitate substantially all of the vanadate ions and a minor proportion of the chromate ions as their lead salts, adjusting the alkalinity of said solution to a pH within the range of 8-9 to convert substantially all of said aluminum values to alumina hydrate, and co-precipitate said alumina hydrate with said lead salts, and separately recovering the co-precipitate and a substantially vanadium and aluminum-free chromate solution containing the major proportion of the original chromium present.

3. The method of removing and recovering vanadium and aluminum salts from solutes containing a preponderance of a mixture of alkali metal chromates with alkali metal aluminates and a minor proportion of alkali metal vanadates, which includes the steps of providing a source of lead ions in a solution comprising said solutes, adjusting the alkalinity of said solution to a pH within the range of 8-9 to co-precipitate substantially all of the vanadate ions and a minor proportion of the chromate ions of said solutes as their lead salts and to convert substantially all of the alkali metal aluminates of said solutes to alumina hydrate, separating the co-precipitate from the remainder of said solution, contacting said co-precipitate with aqueous sulfuric acid to convert said lead salts to insoluble lead sulfate and a solution comprising soluble acids of chromium and vanadium and to convert said alumina hydrate to soluble aluminum sulfate, separating said insoluble lead sulfate from said acid solution, and recycling said insoluble lead sulfate to said solution of said solutes as said source of lead ions.

4. The method of removing and recovering vanadium and aluminum values from a solution comprising the same as vanadates and aluminates and a preponderance of alkali metal chromates, which includes the steps of contacting said solution at pH 8-9 with a lead compound which provides a source of lead ions therein, separately recovering the precipitate which forms, contacting said precipitate with aqueous alkali metal hydroxide to dissolve the same and form a solution, contacting said solution with sulfite ion to reduce the chromate ions to the chromic state and to precipitate chromic hydroxide and lead sulfide, separating said precipitates from the remaining solution contacting said solution with a source of barium ions to precipitate an insoluble barium and vanadium containing precipitate, and separately recovering said precipitate and said solution.

5. The method of removing and recovering vanadium and aluminum salts from a solution comprising a preponderance of a mixture of alkali metal chromates with alkali metal aluminates and a minor proportion of alkali metal vanadates, which includes the steps of adding an inorganic lead compound to a first aqueous solution of said solutes to provide a source of lead ions therein, adjusting the alkalinity of said first solution to a pH within the range of 8-9 to form a first co-precipitate including substantially all of said alkali metal aluminates as alumina hydrate, separating said first co-precipitate from the remainder of said solution, contacting said first co-precipitate with aqueous alkali metal hydroxide in stoichiometric excess of the amount required to react with the aluminum and lead compounds of said co-precipitate, to form a second solution comprising alkali metal salts of the elements of said first co-precipitate, contacting said second solution with a source of sulfide ions to reduce the chromate ions and to form a second co-precipitate of lead sulfide and chromic hydroxide, separating said second co-precipitate from the remainder of said second solution, contacting said remainder of said second solution with a source of barium ions to precipitate an insoluble barium-vanadium complex, and separately recovering said insoluble complex and said solution.

6. The method of removing and recovering vanadium and aluminum salts from solutes comprising a preponderance of a mixture of alkali metal chromates with alkali metal aluminates and a minor proportion of alkali metal vanadates, which includes the steps of contacting a solution comprising said solutes with a water insoluble inorganic lead compound, adjusting the alkalinity of said solution to a pH within the range of 8-9 to co-precipitate substantially all of the vanadate ions and a minor proportion of the chromate ions as lead salts and substantially all of said alkali metal aluminates as alumina hydrate, separating the co-precipitate from the remainder of said solution, contacting said co-precipitate with aqueous alkali metal hydroxide in stoichiometric excess of the amount required to react with the aluminum and lead compounds of said co-precipitate to form a solution comprising alkali metal salts of the elements of said co-precipitate, contacting said solution of alkali metal salts with a source of sulfide ions to reduce the chromate ions, precipitate lead sulfide and chromic hydroxide therefrom, separating said precipitate, contacting the remaining solution with a source of barium ions to precipitate an insoluble complex containing substantially all of the vanadium of said remaining solution, and separately recovering said insoluble complex and purified aqueous alkali metal aluminate solution.

7. The method of removing and recovering vanadium and aluminum salts from solutes comprising a preponderance of a mixture of alkali metal chromates with alkali metal aluminates and a minor proportion of alkali metal vanadates, which includes the steps of contacting a solution of said solutes with a source of lead ions, adjusting the alkalinity of said solution to a pH within the range of 8-9 to co-precipitate substantially all of the vanadate ions and a minor proportion of the chromate ions as their lead salts and substantially all of said alkali metal aluminates as alumina hydrate, separating the co-precipitate from the remainder of said solution, contacting said co-precipitate with aqueous alkali metal hydroxide in stoichiometric excess of the amount required to react with the aluminum and lead compounds therein to form a solution comprising alkali metal salts of the elements of said co-precipitate, contacting said alkali metal salt solution with a source of sulfide ions to reduce the chromate ions and co-precipitate chromic hydroxide and lead sulfide, separating said co-precipitate from the remainder of the solution, contacting the remainder of the solution with a source of barium ions to precipitate an insoluble complex containing substantially all of vanadium of said latter solution and substantially all of the barium ions added thereto, separately recovering said insoluble barium-vanadium complex, recovering the remainder of said latter solution as purified aqueous alkali metal aluminate, contacting said chromic hydroxide-lead sulfide co-precipitate with aqueous sulfuric acid to convert said chromic hydroxide to chromic sulfate and said lead sulfide to insoluble lead sulfate, recovering said insoluble lead sulfate, and recycling the same to the original solution of said solutes as said source of said lead ions.

TOM S. PERRIN.
ROBERT G. BANNER.

REFERENCES CITED

The following references are of record in the file of this patent:

UNITED STATES PATENTS

| Number | Name | Date |
|---|---|---|
| 620,935 | Krebs | Mar. 14, 1899 |
| 734,668 | Suchy | Nov. 10, 1903 |
| 868,807 | Potter | Oct. 22, 1907 |
| 1,784,950 | Udy | Dec. 16, 1930 |
| 2,357,988 | Van Wirt | Sept. 12, 1944 |

OTHER REFERENCES

Comey & Hahn—"Dictionary of Chemical Solubilities, Inorganic," 2nd Ed. pages 10 and 257. Publ. by the MacMillan Co., New York, 1921.

Prescott & Johnson—"Qualitative Chemical Analysis," 5th Ed., page 136, Publ. by D. Van Nostrand Co., New York, 1901.